July 7, 1970 J. C. MARSH, JR 3,519,737
RESONANT BANDPASS FILTER HAVING TWO UNDESIRED FREQUENCY CANCELLATION TRAPS
Filed June 7, 1967 2 Sheets-Sheet 1

INVENTOR
JAMES C. MARSH, JR.
BY Eugene M. Whitacre
ATTORNEY

INVENTOR
JAMES C. MARSH, JR.
BY Eugene M. Whitacre
ATTORNEY

United States Patent Office 3,519,737

Patented July 7, 1970

3,519,737
RESONANT BANDPASS FILTER HAVING TWO UNDESIRED FREQUENCY CANCELLATION TRAPS

James C. Marsh, Jr., Indianapolis, Ind., assignor to RCA Corporation, a corporation of Delaware Filed June 7, 1967, Ser. No. 644,153
Int. Cl. H04n 5/48
U.S. Cl. 178—5.8 7 Claims

ABSTRACT OF THE DISCLOSURE

In a color television receiver, an intermediate frequency bandpass filter circuit of the bifilar T type is provided with two coupled parallel resonant circuits to provide attenuation at two select frequencies adjacent to the pass band.

This invention relates to signal bandpass filters suitable for use in the intermediate frequency amplifier of monochrome or color television receivers and to rejection or trap circuits used for attenuating undesired signals applied to the filter.

In intermediate frequency amplifiers for monochrome and color television receivers it is conventional to provide filter circuits which attenuate the accompanying and the adjacent channel sound carriers relative to the picture carrier. These conventionally used filter circuits fall into two general classes, iteratively connected ladder networks and cancellation null networks. A succession of stagger tuned circuits at the interstage of a succession of amplifiers with absorption traps coupled to the tuned circuits is an example of an iteratively connected filter network. A bridged-T network is an example of a cancellation null network wherein null cancellation of a particular frequency is achieved. Monochrome television receivers have used the iteratively connected networks to advantage for many years. Iteratively connected filter circuits of the ladder type display a phase characteristic related to the amplitude response which has a limit value defined by the minimum phase criteria. This prevents the phase characteristic from being chosen independently of the desired amplitude response. In color television receiver design it has been shown that cancellation null networks provide superior phase characteristics in the frequency range of the chrominance modulated subcarrier compared to the iteratively connected network.

It is therefore advantageous in color television receivers to use rejection filter networks of a variety such as to obtain a phase characteristic not limited by the minimum phase criteria. The bifilar-T trap network is a cancellation null type network and provides the desired attenuation of accompanying sound carrier while simultaneously providing a more desirable phase characteristic in the pass band. The bifilar-T network has been shown in the prior art providing attenuation of both the accompanying and the adjacent sound carriers. However, when so used the trap resonant circuits are difficult to align in that adjustment of one trap circuit affects the alignment of the second trapping circuit. Furthermore high Q, low inductance to capacitance ratio resonant circuits are necessary to match the negative inductance and resistance provided by the bifilar-T coil center tap. Because of the aforementioned problems, the bifilar-T trap has been used almost exclusively with only one resonant tank circuit to achieve only a single attenuation trapping frequency.

Accordingly, it is a primary object of this invention to provide an improved signal bandpass network providing selected frequency attenuation.

It is an object of this invention to provide a cancellation null type network having two cancellation frequencies of high signal attenuation.

It is another object of this invention to provide a cancellation null type network wherein alignment of the two resonant trap frequencies is a simple straight forward procedure.

Still another feature is that the coil and capacitor values are easily realizable without severe constraints on coil Q or the necessity for precision parts.

These objects and features are achieved by this invention in a frequency bandpass filter of the bifilar-T type wherein the trap circuit branch has a second trap circuit shunt coupled to it such that attenuation of the wave coupling is effected at two frequencies.

Further features of this invention will become apparent upon reading the detailed description in conjunction with the figures presented herewith.

Figure 1:
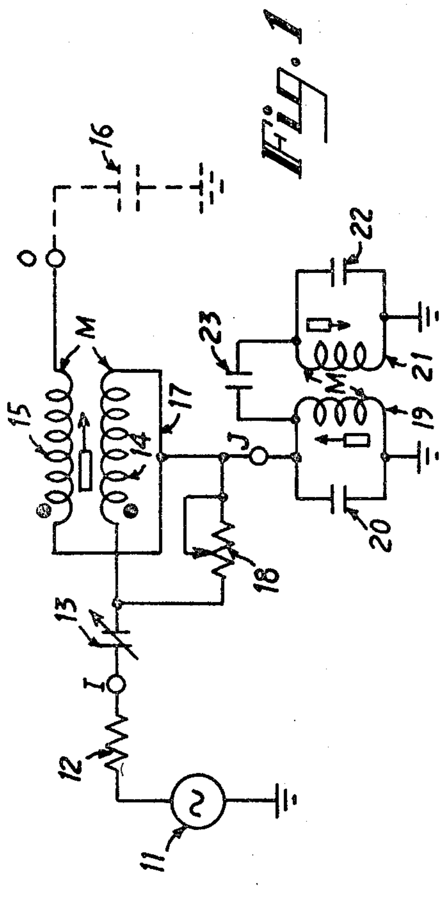
FIG. 1 is a simplified schematic circuit diagram of an interstage coupling network embodying this invention.

Referring now to FIG. 1 for a detailed description of this invention, there is shown schematically a resonant bandpass network coupling an input terminal I to an output terminal O. An intermediate frequency wave source 11, with its characteristic impedance 12 is connected between the input terminal I and a point of reference potential shown as ground. A variable coupling capacitor 13 is connected between the input terminal I and an end terminal of a pair of series connected mutually coupled inductances 14 and 15. The inductances 14 and 15 are connected in series mutual aiding such that the inductance of the pair connected in series equals the sum of the individual inductances plus two times the mutual between them. This is often referred to in the art as series mutual aiding. The remaining end terminal of the series connected inductances 14 and 15 is connected to the output circuit terminal O. An output utilization circuit represented by a capacitor 16 is connected between the output terminal O and ground. The pair of mutually coupled inductors 14 and 15 resonate with the capacitors 16 and 13 and with any stray capacitances which may exist between the inductances 14 and 15 to produce a resonant bandpass network for coupling the input terminal I to the output terminal O.

The pair of mutually coupled inductances 14 and 15 are connected in series mutual aiding by a connection 17 from one end of inductor 14 to one end of inductor 15. This connection 17 is shown in FIG. 1 as also connected to a terminal designated J. A variable resistor 18 is connected across inductor 14 and provides a control of the cancellation rejection at the trapping frequency.

A parallel resonant network comprising an adjustable conductor 19 and a capacitor 20 is connected from terminal J to ground. This parallel resonant network provides a critical value of inductance and resistance between terminal J and ground to develop voltages at the frequency to be rejected. The phase and amplitude of the developed voltages are such as to cancel voltages at corresponding frequencies developed by the inductors 14 and 15. Thus a null output occurs at the output terminal O which corresponds to the frequency to be rejected. The undesired signals are therefore, highly attenuated. Perfect cancellation would produce zero output, and the trapped frequency would be infinitely attenuated. Practically realizable attenuation ratios approach forty db in practice.

The circuit of FIG. 1 provides an improvement to the bifilar-T resonant bandpass trapping circuit in that an attenuation notch is provided at two frequencies to be rejected. The parallel resonant network consisting of inductor 19 and capacitor 20 is caused to provide the critical value of inductive reactance and resistance at two separate frequencies by coupling to it an additional resonant network comprising an adjustable inductor 21 and capacitor 22. In FIG. 1 inductor 19 and inductor 21 are shown having an inductive mutual coupling between them. Further shown in FIG. 1 is a capacitor 23 providing capacitance coupling between the first resonant network and the second resonant network. The combined network comprising inductors 19 and 21, capacitors 20 and 22 and the indicated coupling provided between terminal J and the ground a doubly resonant network the impedance characteristics of which provide the critical inductive reactance and resistance value at two separate frequencies.

Figure 2:
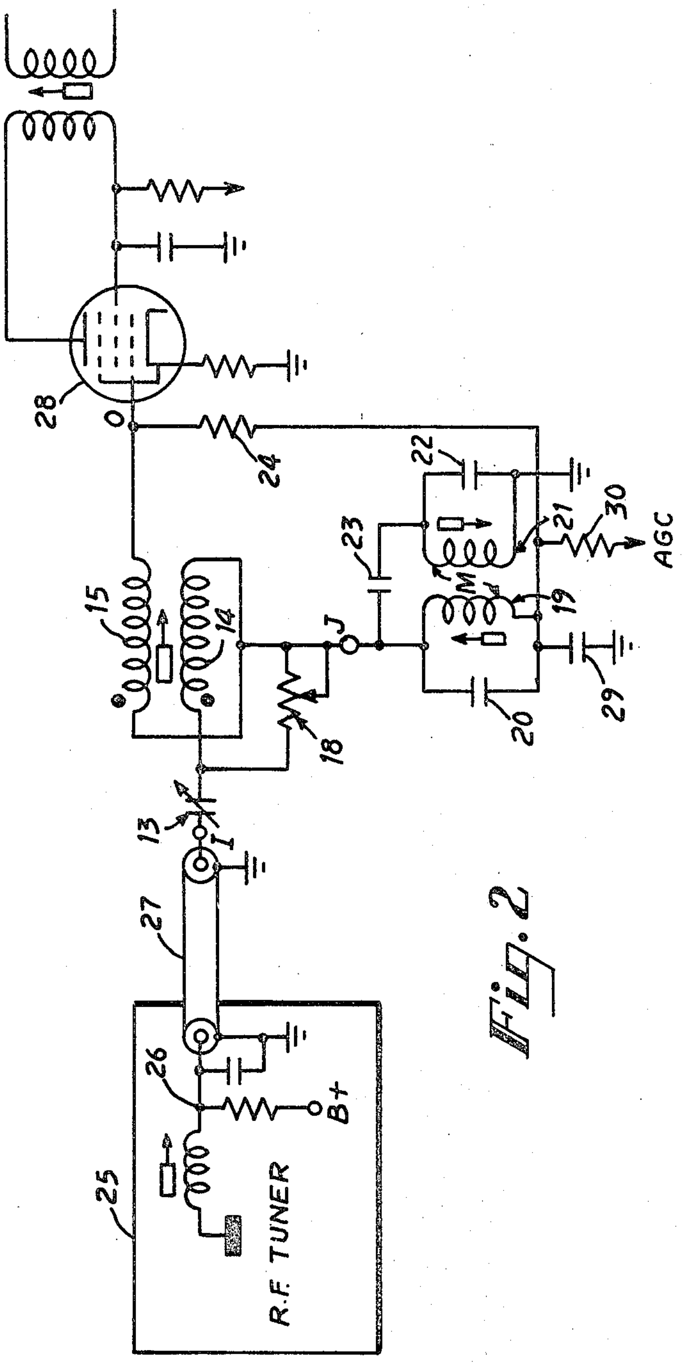
FIG. 2 is a schematic circuit diagram of an interstage coupling network used for coupling signals from the tuner to the intermediate frequency amplifier channel of a television receiver.

FIG. 2 shows how the bandpass network described in FIG. 1 is applied to a television receiver intermediate frequency amplifier system. FIG. 2 shows a radio frequency tuner 25 having an intermediate frequency output terminal 26 which is coupled via a cable 27 to the input terminal I of a resonant bandpass network. The resonant bandpass network output terminal O is connected to the control grid of a vacuum tube 28 which provides the first stage amplification in the intermediate frequency system of the television receiver. This vacuum tube amplifier 28 has an input capacity not shown between its control grid and ground which corresponds to the capacitor 16 in FIG. 1.

In addition to the elements shown in FIG. 1, the circuit of FIG. 2 includes a radio frequency bypass capacitor 29 connected between the lower end of the parallel resonant circuit 19–20 and ground. A decoupling resistor 30 is connected between a source of automatic gain control voltage, not shown, and the control grid of the vacuum tube 28 via inductors 15 and 19. Also a resistor 24 is connected between the output terminal O and the lower end of the parallel resonant circuit 19–20 to provide Q loading and bandwidth control.

Figure 3:
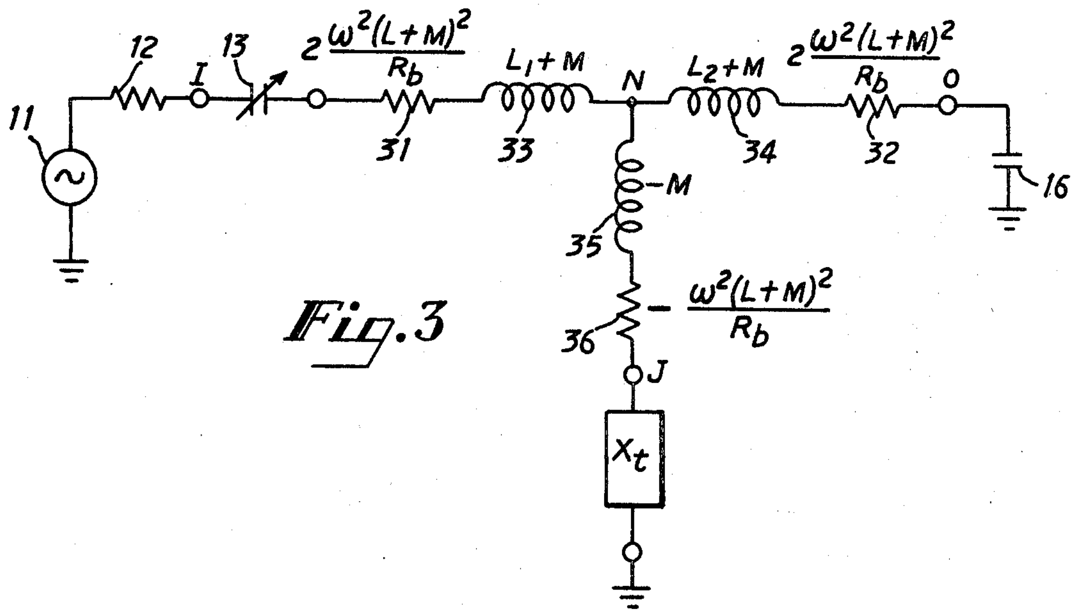
FIG. 3 is an equivalent schematic circuit diagram of a bifilar-T network of the type shown in FIG. 1.

FIG. 3 is an equivalent circuit diagram of the network of FIG. 1. The input wave source 11 and its source impedance 12 is shown coupled to the input terminal I, and the output utilization circuit is represented by capacitor 16 as is shown in FIG. 1. The variable coupling capacitor 13 is shown between the input terminal I and one end terminal of the equivalent circuit for inductances 14 and 15. The equivalent circuit for elements 14, 15, and 18 is an inductive T network comprising two series inductances 33 and 34 and a shunt inductance 35. In FIG. 3, $L_1$ is the inductance of inductor 14 measured with inductor 15 open circuit. $L_2$ is the inductance of inductor 15 measured with inductor 14 open circuit. The value of M may be obtained at low frequencies by measuring inductors 14 and 15 connected series aiding and using the formula for the total inductance:

$$L_t = L_1 + L_2 + 2M$$

Since $L_1$, $L_2$ and $L_t$ are known then M can be found. When the pair of inductors 14 and 15 are the same and tightly coupled as in a bifilar wound coil, then $L_1 = L_2 = M$.

For the equivalent circuit in FIG. 3, $L_1$, $L_2$ and M have been set equal and further defined as equal to L. Also, the inductors 14 and 15 in FIG. 1 have been assumed to be lossless and infinite Q for the purposes of the equivalent circuit. The inductive T equivalent network includes the two series connected inductors 33 and 34 whose values are $L_1+M$ and $L_2+M$. Because $L_1$, $L_2$, and M are equal to L then inductors 33 and 34 are each equal to 2L. A juncture is shown between inductors 33 and 34 and is designated as N. This electrical junction is a non-physically realizable point and care must be used in references to it. In the T equivalent circuit an additional inductor 35 is connected between the juncture N and terminal J. The value of this inductor 35 is a negative mutual inductance —M. Also connected between juncture N and terminal J and in series with inductor 35 is a negative resistor 36 of a value equal to:

$$\frac{-\omega^2(L+M)^2}{R_b}$$

$R_b$ is the resistance of the bridging resistor 18 connected across inductor 14 in FIG. 1 and $\omega$ is $2\pi$ times the wave frequency. Also shown in the equivalent circuit in FIG. 3 is a pair of resistors 31 and 32 connected in series with inductors 33 and 34. The resistors 31 and 32 as well as resistor 36 represent the transformed value of the bridging resistor 18. These resistors 31 and 32 are both equal to:

$$\frac{2\omega^2(L+M)^2}{R_b}$$

The reactive network between terminal J and ground is designated $X_t$. It is the role of this network to match the negative mutual inductance 35 and the negative resistance 36 with a complementary positive inductance and a positive resistance. At the trap frequency the sum of the impedances from the juncture N and ground will be zero. When a zero impedance condition exists, then the wave source 11 is decoupled from the utilization circuit comprising capacitor 16.

In the television receiver intermediate frequency amplifier, the undesired frequencies which it is desired to trap are the accompanying sound carrier wave at 41.25 mega-hertz, and the carrier wave for the adjacent channel sound at 47.25 mega-hertz. The critical impedance for trapping at 47.25 mHz. is provided by the parallel resonant network comprising inductor 19 and capacitor 20. The network 19–20 is tuned to provide an inductive reactance and a resistance component to cancel the negative inductive reactance 35 and resistance 36 components at 47.25 mHz. In an operation embodiment of the invention the parallel resonant circuit is tuned in the vicinity of 50 mHz.; is of a low Q; and of low inductance to capacitance ratio design.

Coupled to the parallel resonant network 19–20 is a second parallel resonant network comprising the inductor 21 and the capacitor 22 which provides the impedance for trapping at 41.25 mHz. The second parallel resonant network is of relatively high Q and high inductance to capacitance ratio design. This circuit is tuned to reflect inductive reactance and resistance components between the terminal J and ground to cancel the negative inductive reactance 35 and negative resistance 36 components at 41.25 mHz. In a practical embodiment, when decoupled from the first resonant network 19–20, the second network 21–22 resonates at 49.5 mHz. The two resonant circuits are in fact tuned to substantially the same frequency, and when they are coupled may be considered as an overcoupled double-tuned network. When the first and second networks are coupled together, the frequency resonance of the second network is altered significantly to about 41.9 mHz. because of its high inductance to capacitance ratio design. In contrast, the resonance of the first resonant network is substantially not affected because of its low inductance to capacitance ratio design and low impedance. The capacitance 23 necessary for overcoupling of the two resonant networks is small compared with the capacitor 20. Therefore the resonance of the first resonant network is not significantly affected by the impedance of the second resonant network coupled via capacitor 23.

In the alignment procedure the inductor 19 is adjusted for minimum response of the overall network at the first frequency 47.25 mHz. Next the inductor 21 is adjusted for minimum response of the overall network at the second frequency 41.25 mHz. During this step detuning of the first resonant network is minimal and it may not be necessary to repeat the alignment procedure.

In the design of the intermediate frequency system it is desired to highly attenuate the adjacent channel sound carrier with a broad trapping notch such that the frequency modulation of the sound carrier does not take it out of the notch. Furthermore, if the 47.25 mHz. adjacent sound carrier is not attenuated it will beat with the received picture carrier at 45.75 mHz. producing a highly visible beat pattern. Therefore high attenuation and a broad notch is desired. This is achieved by the selection of the first resonant network resonance frequency and its inductance capacitance ratio. The Q exhibited by the resonant network 19–20 is selected so that the resistive component of the network 19–20 matches the negative resistance 36. Therefore, near perfect cancellation is achieved for the trapping of the undesired adjacent sound carrier. In the alignment procedure the value of the variable resistor 18 across the inductor 14 can then be adjusted for the exact negative resistance value in the equivalent circuit and trapping is then optimized for the adjacent sound carrier.

The trapping of the accompanying sound carrier is a different problem in that the notch in the frequency response characteristic should be sharp and not too deep. That is, attenuation of sound should be sharp enough with respect to frequency to not affect the color sidebands transmitted in the high video frequency portion of the pass band and the attenuation should be sufficient to prevent 920 kilocycle beat with the color subcarrier. Since the accompanying sound is the desired signal, total attenuation is not generally desired. The accompanying sound carrier is at 41.25 mHz. and the second parallel resonant circuit when coupled to the first is resonant at a slightly higher frequency. As the networks are overcoupled and therefore doubly resonant, the first network terminals provides the correct inductive reactance at 41.25 mHz. However, the resistance value may not be just correct. This is not absolutely necessary in that high attenuation is not always desired. However, adjustment of the resistance value presented between terminal J and ground is possible by adjusting the coupling capacitor 23. In this way a perfect network is possible providing the correct inductance and resistance at two selected frequencies.

Figure 4:
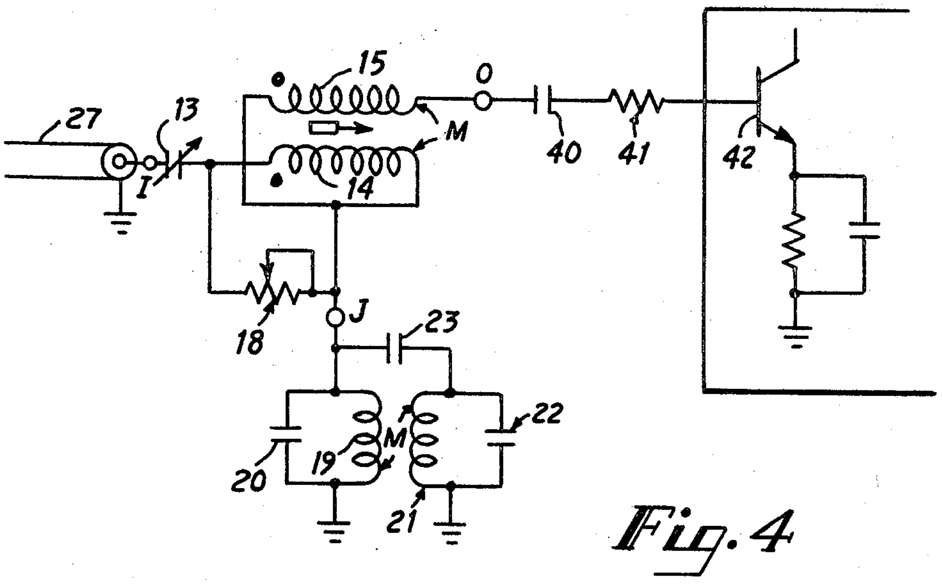
FIG. 4 is a schematic circuit diagram of a coupling network used with transistor amplifiers.

Another embodiment of this invention is shown in FIG. 4 as an application of the invention to a transistor intermediate frequency amplifier system having a transistor 42 input stage. Superior performance has been obtained with a circuit identical to the vacuum tube version except for a matching network at the bandpass network output O comprising a resistor 41 and a capacitor 40 connected in series between output terminal O and the base electrode of the transistor 42. The elements in FIG. 4 having the same designation as those elements in FIG. 2 providing the same function as specified previously.

A list of component values is included below to indicate representative component sizes as used in the embodiment of this invention shown in FIG. 2.

Adjustable capacitor 13—3–15 picofarad
Capacitor 20—91 picofarad
Capacitor 22—15 picofarad
Capacitor 23—5 picofarad
Capacitor 29—1000 picofarad
Adjustable resistor 18—15 kilohms
Resistor 30—100 kilohms
Resistor 24—5.6 kilohms
Adjustable inductor 14—0.4–0.82 microhenry
Adjustable inductor 15—0.34–.51 microhenry
Adjustable inductor 19—0.159–0.195 microhenry
Adjustable inductor 21—0.678–1.16 microhenry

What is claimed is:

1. A coupling network for attenuating signals of at least two different frequencies in a band of signals applied to said network comprising:

input, output and common terminals for said network, a pair of mutually coupled inductors connected in series mutual aiding between said input and output terminals, a parallel resonant circuit coupled between the connections between said inductors and said common terminal, further resonant circuit means coupled in parallel with said parallel resonant circuit, said resonant circuit means and said parallel resonant circuit both having inductance and capacitance, the inductance-to-capacitance ratio of one of said parallel resonant circuit and said resonant circuit means being low relative to that of the other, said parallel resonant circuit being tuned for the attenuation of signals of a first frequency in a band of frequencies translated through said network, and said resonant circuit means being tuned for the attenuation of signals of a second and different frequency in a band of frequencies translated through said network.

2. A coupling network for the intermediate frequency channel of a television receiver comprising:

input, output and common electrodes for said network, a pair of mutually coupled inductors connected in series mutual aiding between said input and output terminals; said inductors tuned to provide a bandpass response for an intermediate frequency television signal including a sound carrier wave separated by a fixed frequency from a picture carrier wave, a parallel resonant circuit coupled between the connection between said inductors and said common terminal, further resonant circuit means coupled in parallel with said parallel resonant circuit, said resonant circuit means and said parallel resonant circuit both having inductance and capacitance, the inductance-to-capacitance ratio of one of said parallel resonant circuit and said resonant circuit means being low relative to that of the other, said parallel resonant circuit being tuned for the attenuation of signals of a first frequency in a band of frequencies translated through said network, and said resonant circuit means being tuned for the attenuation of signals of a second and different frequency in a band of frequencies translated through said network.

3. A coupling network as defined in claim 2 wherein said resonant circuit means coupled to the parallel resonant circuit comprises a second parallel resonant circuit and an inductive mutual coupling.

4. A coupling network as defined in claim 2 wherein said resonant circuit means coupled to the parallel resonant circuit comprises a second parallel resonant circuit and a capacitance mutual coupling.

5. A coupling network as defined in claim 3 including a resistance means coupled between said input terminal and the connection between said inductors.

6. A coupling network as defined in claim 3 wherein said high inductance capacitance ratio parallel resonant circuit is of higher Q than said low inductance capacitance ratio resonant circuit and is tuned for the attenuation of signals of the frequency of the accompanying sound carrier wave of a television signal and said low inductance capacitance ratio resonant circuit is tuned for attenuation of signals of the frequency of the sound carrier wave of an adjacent channel television signal.

7. In an intermediate frequency amplifier system of a television receiver a resonant bandpass network providing selected frequency attenuation comprising:

an intermediate frequency wave source having two terminals, an output utilization circuit having two terminals, a pair of mutually coupled bifilar wound inductors providing four connecting leads, a junction connection of one pair of connecting leads of the pair of inductors connecting them in series mutual aiding, a capacitor connected between the first terminal of the intermediate frequency wave source and one of the unconnected leads of the bifilar wound inductors, the remaining lead of the pair of bifilar wound inductors connected to the first terminal of the output utilization circuit, the second terminal of the intermediate frequency wave source connected to the second terminal of the utilization circuit, a first parallel resonant circuit comprising a first inductor and a first capacitor, a second parallel resonant circuit comprising a second inductor and a second capacitor, the first resonant circuit connected between the junction connection of said pair of bifilar inductors and the second terminal of the output utilization circuit, and a mutual coupling capacitor coupling the second resonant circuit in parallel with said first resonant circuit.

References Cited

UNITED STATES PATENTS

| | | | |
|---|---|---|---|
| 2,934,722 | 4/1960 | Anrooy | 333—77 |
| 3,029,400 | 4/1962 | Nelson | 333—77 |
| 3,114,889 | 12/1963 | Avins | 333—77 |
| 3,188,566 | 6/1965 | Bullene | 333—76 |

RICHARD MURRAY, Primary Examiner

R. P. LANGE, Assistant Examiner

U.S. Cl. X.R.

333—76, 77